United States Patent
Chang

(10) Patent No.: US 10,910,856 B2
(45) Date of Patent: Feb. 2, 2021

(54) DISCHARGE APPARATUS

(71) Applicant: PEGATRON CORPORATION, Taipei (TW)

(72) Inventor: Yu-Chung Chang, Taipei (TW)

(73) Assignee: PEGATRON CORPORATION, Taipei (TW)

( * ) Notice: Subject to any disclaimer, the term of this patent is extended or adjusted under 35 U.S.C. 154(b) by 189 days.

(21) Appl. No.: 16/203,268

(22) Filed: Nov. 28, 2018

(65) Prior Publication Data

US 2019/0173306 A1 Jun. 6, 2019

(30) Foreign Application Priority Data

Dec. 6, 2017 (TW) .............................. 106142757 A

(51) Int. Cl.
  *H02J 7/00* (2006.01)
  *H02H 3/087* (2006.01)
  *H02M 1/32* (2007.01)

(52) U.S. Cl.
  CPC ........... *H02J 7/0063* (2013.01); *H02H 3/087* (2013.01); *H02J 7/0068* (2013.01); *H02M 1/32* (2013.01); *H02J 2007/0067* (2013.01); *H02M 2001/322* (2013.01)

(58) Field of Classification Search
  USPC ........................................ 320/103, 136, 166
  See application file for complete search history.

(56) References Cited

U.S. PATENT DOCUMENTS

| | | | | |
|---|---|---|---|---|
| 3,648,145 A | * | 3/1972 | Meyer | H02H 7/18 320/136 |
| 4,204,160 A | * | 5/1980 | Voll | G01V 3/10 324/236 |
| 5,381,296 A | * | 1/1995 | Ekelund | H02H 3/087 361/106 |
| 5,771,159 A | * | 6/1998 | Sako | H02M 1/425 363/17 |
| 5,774,351 A | * | 6/1998 | Hsieh | H02M 7/4807 363/132 |
| 5,828,207 A | * | 10/1998 | Saadeh | G06F 1/30 323/281 |
| 2005/0157443 A1 | * | 7/2005 | Bryan | H02H 9/004 361/118 |
| 2009/0045792 A1 | * | 2/2009 | Sugawara | H02J 7/0029 323/282 |
| 2009/0179613 A1 | * | 7/2009 | Masho | H02J 7/345 320/103 |
| 2011/0157946 A1 | | 6/2011 | Lo et al. | |
| 2012/0207505 A1 | | 8/2012 | Kobayashi et al. | |
| 2012/0242309 A1 | * | 9/2012 | Korzeniowski | H02M 3/158 323/282 |

(Continued)

FOREIGN PATENT DOCUMENTS

CN 102647079 8/2012
CN 104810812 7/2015

(Continued)

*Primary Examiner* — Brian Ngo
(74) *Attorney, Agent, or Firm* — J.C. Patents

(57) ABSTRACT

A discharge apparatus is provided. A second discharge path is provided by a second discharge circuit started by a voltage across on a first discharge path provided by a first discharge circuit, so as to discharge a load capacitor.

11 Claims, 3 Drawing Sheets

(56) References Cited

U.S. PATENT DOCUMENTS

| | | | |
|---|---|---|---|
| 2013/0082666 A1* | 4/2013 | Tsai | H02M 1/4208 |
| | | | 323/207 |
| 2015/0084612 A1* | 3/2015 | Kanzaki | H03K 17/6871 |
| | | | 323/282 |
| 2015/0270784 A1* | 9/2015 | Dillersberger | H02M 3/33507 |
| | | | 363/21.12 |
| 2016/0190845 A1 | 6/2016 | Chen | |
| 2016/0268902 A1* | 9/2016 | Yamaguchi | H02M 1/32 |
| 2019/0147921 A1* | 5/2019 | Kuo | H03K 5/19 |
| | | | 307/43 |
| 2019/0173393 A1* | 6/2019 | Chivite Zabalza | H03K 17/107 |
| 2019/0199103 A1* | 6/2019 | Kawano | H02J 7/00712 |

FOREIGN PATENT DOCUMENTS

| | | |
|---|---|---|
| CN | 205657584 | 10/2016 |
| TW | 201123698 | 7/2011 |
| TW | I519024 | 1/2016 |

* cited by examiner

DISCHARGE APPARATUS

CROSS REFERENCE TO RELATED APPLICATION

This application claims the priority benefit of Taiwanese application serial no. 106142757, filed on Dec. 6, 2017. The entirety of the above-mentioned patent application is hereby incorporated by reference herein and made a part of specification.

BACKGROUND

Technology Field

The disclosure relates to an electronic apparatus and more particularly, to a discharge apparatus.

Description of Related Art

A stable power supply system usually requires a plurality of stabilizing capacitors for maintaining voltage stability. However, when an apparatus applying the power supply system is shutdown, due to residual charge stored in the stabilizing capacitors usually being incompletely discharged, a power-on sequence of the apparatus is affected in a boot-up procedure when the apparatus is reboot, which causes failure of the apparatus in a normal operation. A conventional solution to this issue of the residual charge is to wait for a period of time after the power supply system is powered off for the residual charge to be discharged naturally, thereby preventing the residual charge from affecting the power-on sequence in the boot-up procedure when the apparatus is reboot, which may cause failure of the apparatus in the normal operation. However, this solution would result in inconvenience in the use, and the time required for the discharge of the residual charge is also not easily controlled.

SUMMARY

The disclosure provides a discharge apparatus capable of accelerating the discharge of residual charge, significantly shortening the time required for discharging the residual charge and effectively preventing the residual charge from affecting a power-on sequence in a boot-up procedure.

A discharge apparatus of the disclosure is coupled to a power supply voltage and a load capacitor. The power supply voltage is cut off in a shutdown state. The discharge apparatus includes a rectification circuit, a charge storage unit, a first discharge circuit and a second discharge circuit. The rectification circuit is coupled to the power supply voltage. The charge storage unit is coupled between the rectification circuit and a ground. The charge storage unit is configured to store charge. The rectification circuit induces a current flowing through the rectification circuit to unidirectionally flow from the power supply voltage to the charge storage unit. The first discharge circuit is coupled to the charge storage unit. A first discharge path is provided by the first discharge circuit according to a voltage supplied by the charge storage unit in the shutdown state, so as to discharge the charge storage unit. The second discharge circuit is coupled to the first discharge circuit. A second discharge path is provided by the second discharge circuit according to a voltage across on the first discharge path in the shutdown state, so as to discharge the load capacitor.

An electronic apparatus of the disclosure is coupled to a power supply voltage. The electronic apparatus includes a switch, a load capacitor, a load and a discharge apparatus. The switch controls the supply of the power supply voltage to switch the electronic apparatus to enter a normal operation or a shutdown state. The electronic apparatus is coupled to the switch, the load capacitor and the load and accelerates the discharge of the load capacitor when the electronic apparatus is in the shutdown state. The discharge apparatus includes a rectification circuit, a charge storage unit, a first discharge circuit and a second discharge circuit. The rectification circuit is coupled to the power supply voltage. The charge storage unit is coupled between the rectification circuit and a ground. The charge storage unit is configured to store charge. The rectification circuit induces a current flowing through the rectification circuit to unidirectionally flow from the power supply voltage to the charge storage unit. The first discharge circuit is coupled to the charge storage unit. A first discharge path is provided by the first discharge circuit according to a voltage supplied by the charge storage unit in the shutdown state, so as to discharge the charge storage unit. The second discharge circuit is coupled to the first discharge circuit. A second discharge path is provided by the second discharge circuit according to a voltage across on the first discharge path in the shutdown state, so as to discharge the load capacitor.

In an embodiment of the disclosure, the first discharge circuit includes a bipolar junction transistor and a first resistor. An emitter of the bipolar junction transistor is coupled to a common node of the rectification circuit and the charge storage unit, a collector of the bipolar junction transistor is coupled to the second discharge circuit, and a base of the bipolar junction transistor is coupled to the power supply voltage. The charge stored by the charge storage unit is further discharged to a load of the discharge apparatus via the base of the bipolar junction transistor. The first resistor is coupled between the collector of the bipolar junction transistor and the ground. The first resistor and the bipolar junction transistor form the first discharge path to provide the voltage across to the second discharge circuit.

In an embodiment of the disclosure, the first discharge circuit includes a metal oxide semiconductor transistor, the metal oxide semiconductor transistor is coupled between the power supply voltage and the ground, and a gate of the metal oxide semiconductor transistor is coupled to the first discharge circuit to receive the voltage across.

In an embodiment of the disclosure, the second discharge circuit further includes a second resistor, and the second resistor is coupled between a drain of the metal oxide semiconductor transistor and the power supply voltage.

In an embodiment of the disclosure, the first discharge circuit further includes a second resistor, and the second resistor is coupled between the base of the bipolar junction transistor and the power supply voltage.

In an embodiment of the disclosure, the rectification circuit includes a rectification diode, and an anode and a cathode of the rectification diode are respectively coupled to the power supply voltage and the charge storage unit.

In an embodiment of the disclosure, the charge storage unit includes a capacitor.

To sum up, in the embodiments of the disclosure, the second discharge path is provided by the second discharge circuit started by the voltage across on the first discharge path provided by the first discharge circuit, so as to discharge the load capacitor. In this way, when the electronic apparatus applying the discharge apparatus is shut down, the second discharge path is enabled to accelerate the discharge of the residual charge, thereby significantly shortening the time required for discharging the residual charge and effectively preventing the residual charge from affecting the power-on sequence in the boot-up operation.

To make the above features and advantages of the disclosure more comprehensible, embodiments accompanied with drawings are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
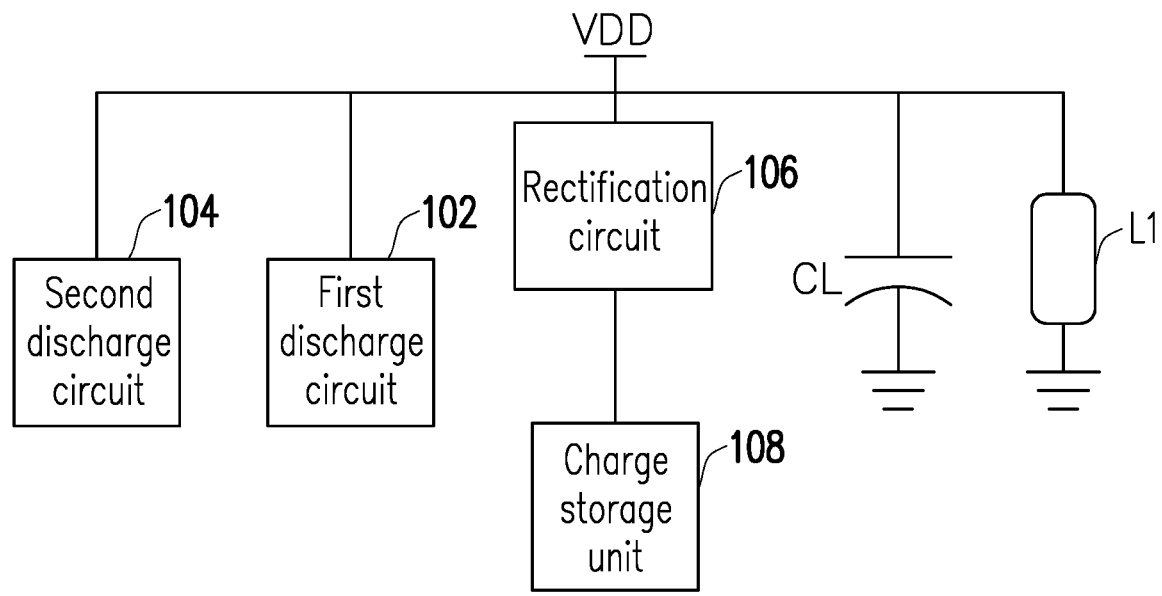
FIG. 1 is the schematic diagrams of an electronic apparatus including a discharge apparatus according to of the present invention.

FIG. 1 is a schematic diagram of an electronic apparatus including a discharge apparatus according to an embodiment of the invention. Referring to FIG. 1, the discharge apparatus of the electronic apparatus includes a first discharge circuit 102, a second discharge circuit 104, a rectification circuit 106 and a charge storage unit 108. The first discharge circuit 102 is coupled to the second discharge circuit 104, the rectification circuit 106 and the charge storage unit 108. The second discharge circuit 104 is coupled to a power supply voltage VDD. The rectification circuit 106 is coupled to the power supply voltage VDD and the charge storage unit 108. In addition, the second discharge circuit 104 is coupled to a load capacitor CL and a load L1 of the electronic apparatus applying the discharge apparatus. The load capacitor CL may be, for example, a stabilizing capacitor or an equivalent load capacitor of the electronic apparatus applying the discharge apparatus. Further, the load L1 may be, for example, an equivalent resistor of a circuit element which is coupled to the discharge apparatus in the electronic apparatus. The electronic apparatus may be, for example, a cellular phone, a computer or any other electronic product with a power supply device.

The rectification circuit 106 may induce a current flowing through the rectification circuit 106 to unidirectionally flow from the power supply voltage VDD to the charge storage unit 108. The charge storage unit 108 may store charge. When the electronic apparatus is shut down, the power supply voltage VDD is stopped from being supplied to an input terminal of the rectification circuit 106. In this circumstance, the charge stored by the charge storage unit 108 may be discharged via the first discharge path provided by the first discharge circuit 102. In addition, a second discharge path may be provided by the second discharge circuit 104 due to a voltage across on the first discharge path, such that the load capacitor CL coupled to the second discharge circuit 104 may be discharged via the second discharge path to accelerate the discharge of the residual charge of the load capacitor CL, thereby significantly shortening the time required for discharging the residual charge and effectively preventing the residual charge in the load capacitor CL from affecting a power-on sequence in a boot-up operation when the electronic apparatus is reboot.

FIG. 2 to FIG. 5 are schematic diagrams of another discharge apparatus according to embodiments of the present invention. In the embodiments illustrated in FIG. 2 to FIG. 5, the first discharge circuit 102 includes a bipolar junction transistor Q1 and resistors R1 and R2. The bipolar junction transistor Q1 is coupled between the second discharge circuit 104 and a common node of the rectification circuit 106 and the charge storage unit 108. The resistor R1 is coupled between a collector of the bipolar junction transistor Q1 and the ground. The resistor R2 is coupled between the power supply voltage VDD and a base of the bipolar junction transistor Q1. The second discharge circuit 104 includes a resistor 103 and a metal oxide semiconductor transistor Q2. The resistor R3 is coupled between the power supply voltage VDD and a drain of the metal oxide semiconductor transistor Q2. A source and the drain of the metal oxide semiconductor transistor Q2 are respectively coupled to the ground and the collector of the bipolar junction transistor Q1. The rectification circuit 106 includes a rectification diode D1. An anode and a cathode of the rectification diode D1 are respectively coupled to the power supply voltage VDD and the charge storage unit 108. Additionally, the charge storage unit 108 includes a capacitor C1, and the capacitor C1 is coupled between the cathode of the rectification diode D1 and the ground.

In the present embodiment, the supply of the power supply voltage VDD may be controlled by a switch S1. The switch S1 may be included in the electronic apparatus applying the discharge apparatus. When the switch S1 is in a turned-on state, the electronic device is in a normal operation state, and the power supply voltage VDD is supplied by the electronic apparatus. When the switch S1 is in a turned-off state, it may be considered as the electronic apparatus entering the shutdown state, and the electronic apparatus may be stopped from supplying the power supply voltage VDD. In the present embodiment, the switch S1 is a power supply switch of the electronic apparatus.

Figure 2:
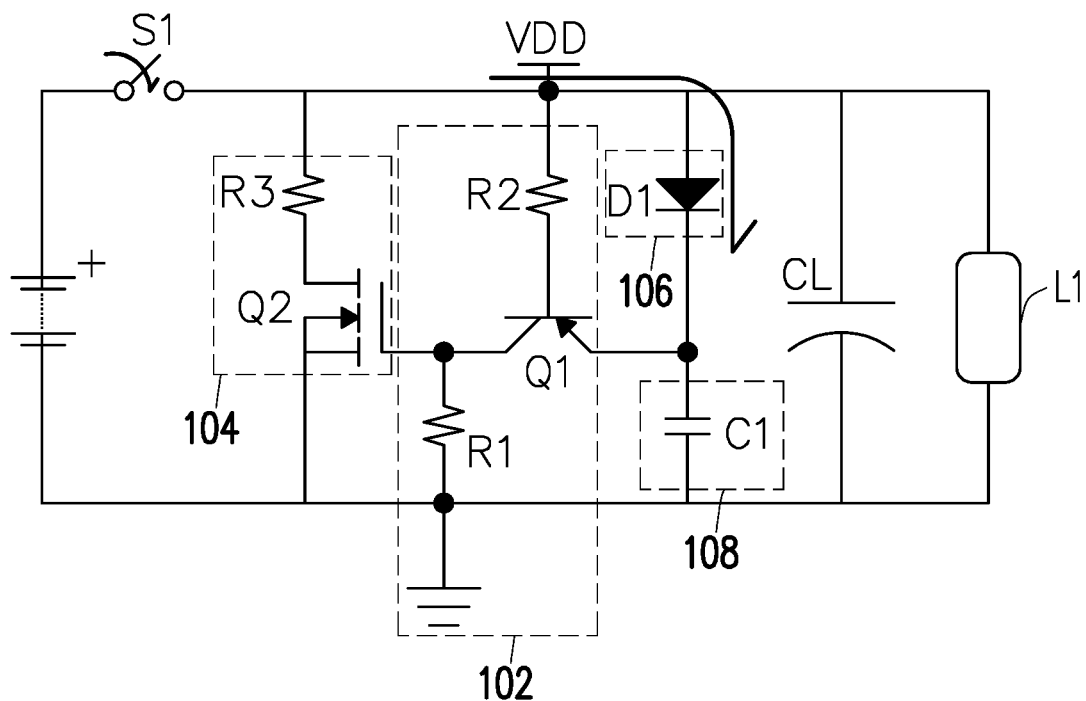
FIG. 2 to FIG. 5 are the schematic diagrams of a discharge apparatus according to the embodiments of the present invention.

FIG. 2 schematically illustrates that the switch S1 is in a turned-on state. In FIG. 2, the capacitor C1 may be charged by the power supply voltage VDD via the rectification diode D1. In this circumstance, the power supply voltage VDD is applied to the base of the bipolar junction transistor Q1 via the resistor R2, and thus, the bipolar junction transistor Q1 and the metal oxide semiconductor transistor Q2 are both in a turned-off state.

Figure 3:
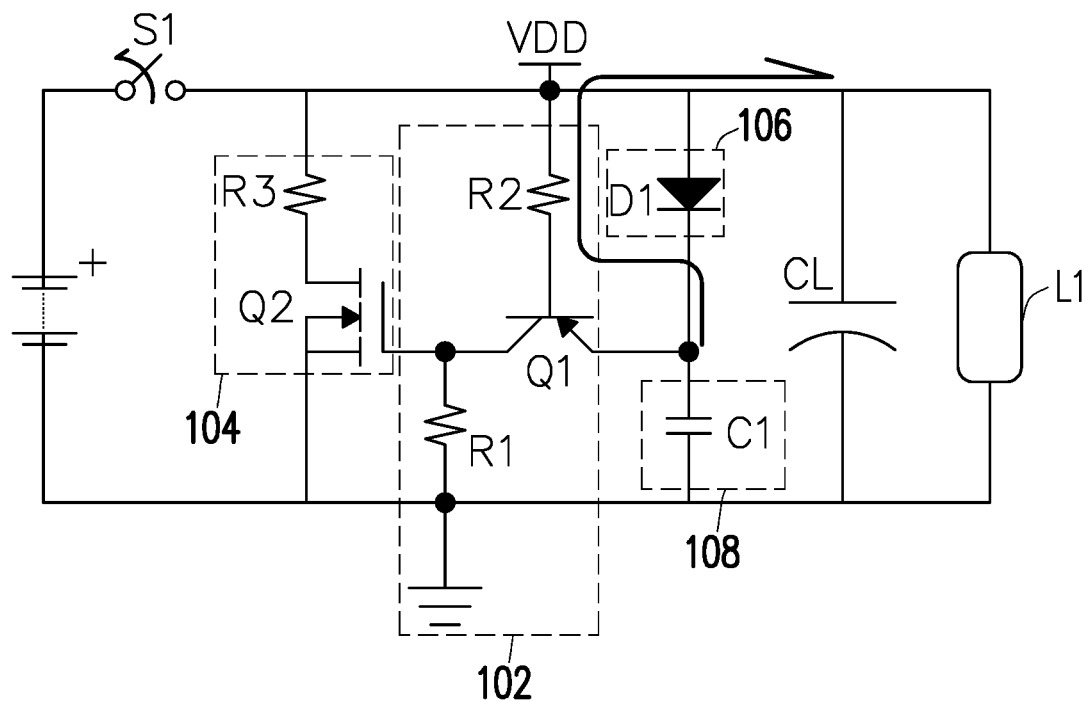
Figure 4:
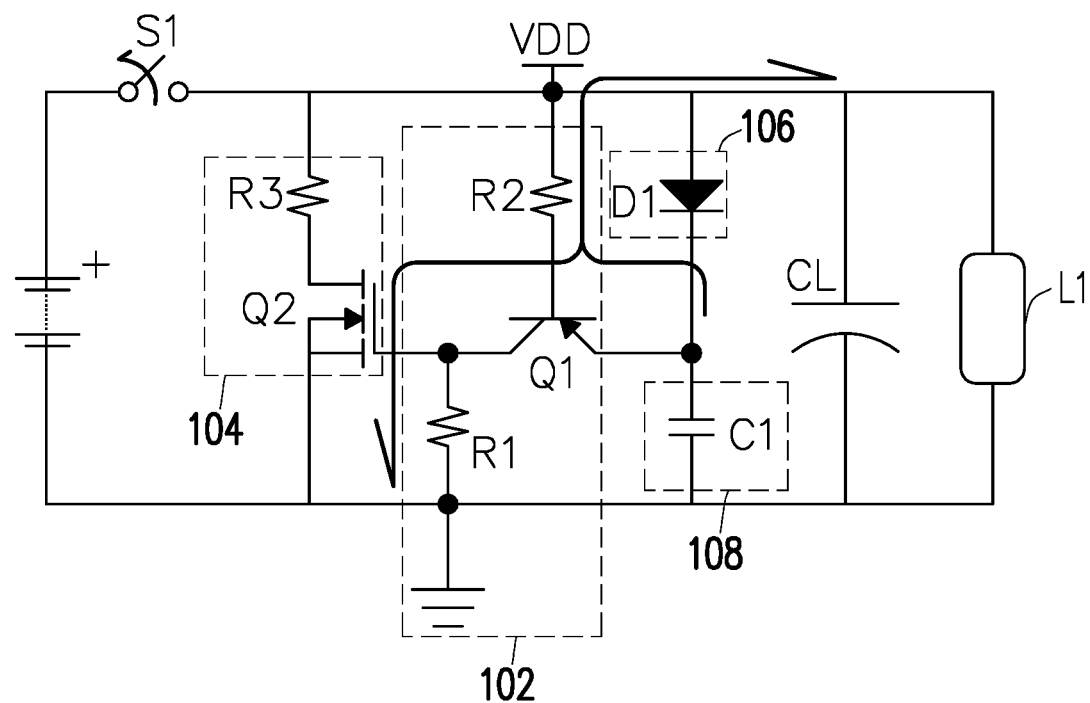
Figure 5:
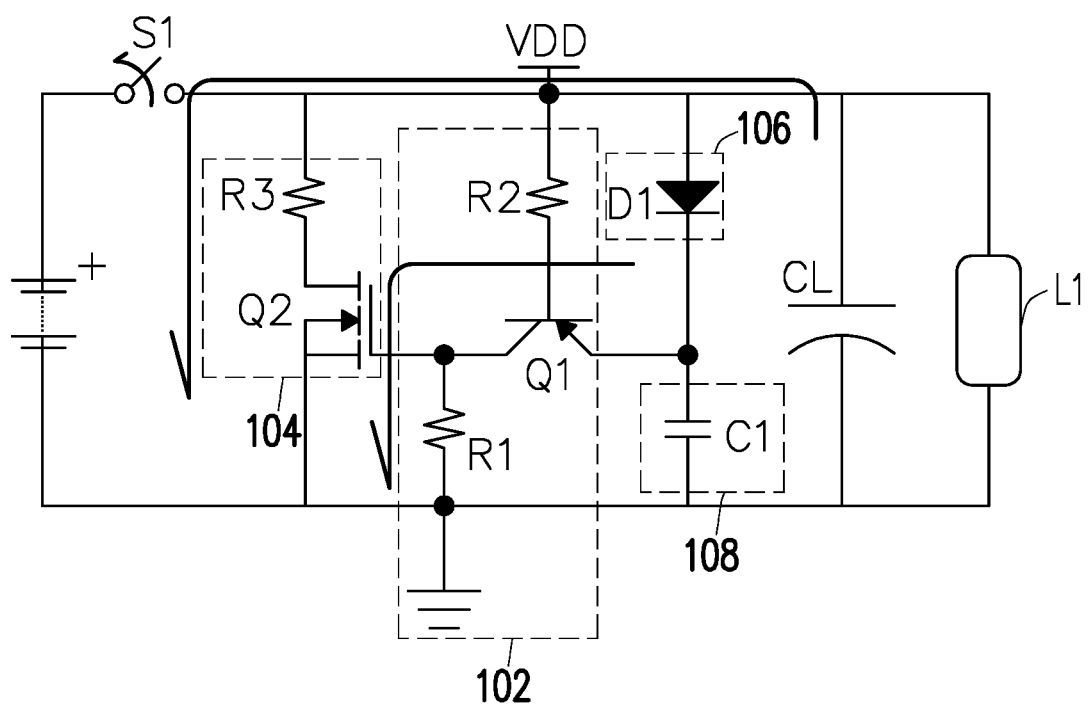

FIG. 3 to FIG. 5 schematically illustrate that the switch S1 is in a turned-off state. In FIG. 3, when the switch S1 enters the turned-off state, the power supply voltage VDD is stopped from being supplied, such that a voltage of the base of the bipolar junction transistor Q1 is dropped slowly. When the voltage of the base of the bipolar junction transistor Q1 is dropped to cause a voltage difference between the emitter and the base of the bipolar junction transistor Q1 to be equal to a barrier voltage of the emitter-base junction, the charge stored by the capacitor C1 may start to flow to the load capacitor CL and the load L1 via the bipolar junction transistor Q1 and the resistor R2.

In addition, as the turning on of the bipolar junction transistor Q1 is turned, a discharge path flowing toward the ground may be further provided by the bipolar junction transistor Q1. As illustrated in FIG. 4, after the bipolar junction transistor Q1 is turned on, the charge stored by the capacitor C1 may also be discharged by flowing toward the ground via the bipolar junction transistor Q1 and the resistor R1. In this way, the voltage across on the resistor R1 is increased. When the voltage across on the resistor R1 is greater than a threshold voltage of the metal oxide semiconductor transistor Q2, the metal oxide semiconductor transistor Q2 enters the turned-on state, by which another discharge path is provided. As illustrated in FIG. 5, in this circumstance, the residual charge in the load capacitor CL may flow to the ground via the resistor R3 and the metal oxide semiconductor transistor Q2, so as to achieve an effect of accelerating the discharge of the residual charge of the load capacitor CL.

It should be noted that the first discharge circuit 102, the second discharge circuit 104, the rectification circuit 106 and the charge storage unit 108 may also be implemented in other manners, which are not limited to the embodiments illustrated in FIG. 2 to FIG. 5. For instance, the aforementioned resistors R2 and R3 are employed to adjust a size of the current, but in some embodiments, the resistors R2 and R3 may also be not disposed. Moreover, for instance, the numbers of the rectification diode D1 and the capacitor C1 may be increased.

In light of the foregoing, in the embodiments of the invention, the second discharge path is provided by the second discharge circuit started by the voltage across on the first discharge path provided by the first discharge circuit, so as to discharge the load capacitor. In this way, when the electronic apparatus applying the discharge apparatus is shut down, the second discharge path is enabled to accelerate the discharge of the residual charge, thereby significantly shortening the time required for discharging the residual charge and effectively preventing the residual charge from affecting the power-on sequence in the boot-up operation, without spending a long time to wait for the discharge of the residual charge.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A discharge apparatus, coupled to a power supply voltage and a load capacitor, the power supply voltage being cut off in a shutdown state, and the discharge apparatus comprising:
   a rectification circuit, coupled to the power supply voltage;
   a charge storage unit, coupled between the rectification circuit and a ground, and configured to store charge, wherein the rectification circuit induces a current flowing through the rectification circuit to unidirectionally flow from the power supply voltage to the charge storage unit;
   a first discharge circuit, coupled to the charge storage unit, wherein a first discharge path is provided by the first discharge circuit according to a voltage supplied by the charge storage unit in the shutdown state, so as to discharge the charge storage unit; and
   a second discharge circuit, coupled to the first discharge circuit, wherein a second discharge path is provided by the second discharge circuit according to a voltage across on the first discharge path in the shutdown state, so as to discharge the load capacitor,
   wherein the first discharge circuit comprises:
      a bipolar junction transistor, having an emitter coupled to a common node of the rectification circuit and the charge storage unit, a collector coupled to the second discharge circuit and a base coupled to the power supply voltage, wherein the charge stored by the charge storage unit is further discharged to a load of the discharge apparatus via the base of the bipolar junction transistor; and
      a first resistor, coupled between the collector of the bipolar junction transistor and the ground, wherein the first discharge path is formed by the first resistor together with the bipolar junction transistor to provide the voltage across to the second discharge circuit.

2. The discharge apparatus according to claim 1, wherein the second discharge circuit comprises:
   a metal oxide semiconductor transistor, coupled between the power supply voltage and the ground, and having a gate coupled to the first discharge circuit to receive the voltage across.

3. The discharge apparatus according to claim 2, wherein the second discharge circuit comprises:
   a second resistor, coupled between a drain of the metal oxide semiconductor transistor and the power supply voltage.

4. The discharge apparatus according to claim 1, wherein the first discharge circuit further comprises:
   a second resistor, coupled between the base of the bipolar junction transistor and the power supply voltage.

5. The discharge apparatus according to claim 1, wherein the rectification circuit comprises:
   a rectification diode, having an anode and a cathode respectively coupled to the power supply voltage and the charge storage unit.

6. The discharge apparatus according to claim 1, wherein the charge storage unit comprises a capacitor.

7. An electronic apparatus, coupled to a power supply voltage, comprising:
   a switch, controlling the supply of the power supply voltage to switch the electronic apparatus to enter a normal operation or a shutdown state;
   a load capacitor; and
   a load; and
   a discharge apparatus, coupled to the switch, the load capacitor and the load, wherein the electronic apparatus in the shutdown state accelerates the discharge of the load capacitor, and the discharge apparatus comprises:
      a rectification circuit, coupled to the power supply voltage;
      a charge storage unit, coupled between the rectification circuit and a ground, and configured to store charge, wherein the rectification circuit induces a current flowing through the rectification circuit to unidirectionally flow from the power supply voltage to the charge storage unit;
      a first discharge circuit, coupled to the charge storage unit, wherein a first discharge path is provided by the first discharge circuit according to a voltage supplied by the charge storage unit in the shutdown state, so as to discharge the charge storage unit; and
      a second discharge circuit, coupled to the first discharge circuit, wherein a second discharge path is provided according to a voltage across on the first discharge path in the shutdown state, so as to discharge the load capacitor,
      wherein the first discharge circuit comprises:
         a bipolar junction transistor, having an emitter coupled to a common node of the rectification circuit and the charge storage unit, a collector coupled to the second discharge circuit and a base coupled to the power supply voltage, wherein the charge stored by the charge storage unit is further discharged to a load of the discharge apparatus via the base of the bipolar junction transistor; and a first resistor, coupled between the collector and the ground of the bipolar junction transistor, wherein the first discharge path is formed by the first resistor together with the bipolar junction transistor to provide the voltage across to the second discharge circuit.

8. The electronic apparatus according to claim 7, wherein the second discharge circuit comprises:

a metal oxide semiconductor transistor, coupled between the power supply voltage and the ground, and having a gate coupled to the first discharge circuit to receive the voltage across.

9. The electronic apparatus according to claim 8, wherein the second discharge circuit comprises:

a second resistor, coupled between a drain of the metal oxide semiconductor transistor and the power supply voltage.

10. The electronic apparatus according to claim 7, wherein the first discharge circuit further comprises:

a second resistor, coupled between the base of the bipolar junction transistor and the power supply voltage.

11. The electronic apparatus according to claim 7, wherein the rectification circuit comprises:

a rectification diode, having an anode and a cathode respectively coupled to the power supply voltage and the charge storage unit.

* * * * *